United States Patent
Tseng (10) Patent No.: US 8,855,095 B2
(45) Date of Patent: Oct. 7, 2014

(54) METHOD AND APPARATUS FOR A COMPONENT CARRIER DEACTIVATION TIMER IN A WIRELESS COMMUNICATION SYSTEM

(75) Inventor: Li-Chih Tseng, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 446 days.

(21) Appl. No.: 13/094,152

(22) Filed: Apr. 26, 2011

(65) Prior Publication Data

US 2011/0268029 A1 Nov. 3, 2011

Related U.S. Application Data

(60) Provisional application No. 61/329,099, filed on Apr. 29, 2010.

(51) Int. Cl.
  H04W 88/02 (2009.01)
  H04W 72/04 (2009.01)
  H04L 5/00 (2006.01)

(52) U.S. Cl.
  CPC ............... *H04L 5/003* (2013.01); *H04L 5/001* (2013.01)
  USPC .......................................... 370/343; 370/328

(58) Field of Classification Search
  USPC .......... 370/278, 328, 331, 348, 343; 455/450, 455/451, 452.1
  See application file for complete search history.

(56) References Cited

U.S. PATENT DOCUMENTS

| | | | | |
|---|---|---|---|---|
| 8,358,594 B2 * | 1/2013 | Lee et al. | ....................... | 370/254 |
| 8,514,793 B2 * | 8/2013 | Gauvreau et al. | ............. | 370/329 |
| 8,675,585 B2 * | 3/2014 | Park et al. | ..................... | 370/329 |
| 8,676,138 B2 * | 3/2014 | Wu | ............................... | 455/104 |
| 2010/0118720 A1 * | 5/2010 | Gauvreau et al. | ............. | 370/252 |
| 2011/0002281 A1 * | 1/2011 | Terry et al. | .................... | 370/329 |
| 2011/0103332 A1 * | 5/2011 | Kuo | .............................. | 370/329 |
| 2011/0205978 A1 * | 8/2011 | Nory et al. | ..................... | 370/329 |
| 2011/0243048 A1 * | 10/2011 | Wang et al. | .................... | 370/311 |
| 2011/0243106 A1 * | 10/2011 | Hsu et al. | ...................... | 370/336 |
| 2011/0249635 A1 * | 10/2011 | Chen et al. | ..................... | 370/329 |
| 2013/0016639 A1 * | 1/2013 | Xu et al. | ........................ | 370/311 |

OTHER PUBLICATIONS

3GPP TSG-RAN WG2-Meeting #69bis, Beijing, China, Apr. 12-16, 2010 (R2-102108).
Office Action on corresponding foreign Patent Application (KR 10-2011-0040389) issued on Jul. 31, 2012.
3GPP TSG-RAN WG2 Meeting #69, San Francisco, U.S.A., Feb. 22-26, 2010 (R2-101077), 2 pages.
3GPP TSG-RAN WG2 Meeting #69bis, Beijing, China, Apr. 12-16, 2010 (R2-102427), 3 pages.
Office Action on corresponding foreign application (JP 2011-100102) dated Nov. 27, 2012.

* cited by examiner

*Primary Examiner* — Ahmed Elallam
(74) *Attorney, Agent, or Firm* — Blue Capital Law Firm, P.C.

(57) ABSTRACT

A method for a Component Carrier (CC) deactivation timer in a wireless communication system includes receiving a first Medium Access Control (MAC) Control Element (CE) for CC Management to activate a first Secondary CC (SCC) that has been already activated by using a second MAC CE for CC Management. The method then includes restarting a deactivation timer for the first SCC based upon the first MAC CE for CC Management.

12 Claims, 5 Drawing Sheets

METHOD AND APPARATUS FOR A COMPONENT CARRIER DEACTIVATION TIMER IN A WIRELESS COMMUNICATION SYSTEM

CROSS-REFERENCE TO RELATED APPLICATIONS

The present Application claims the benefit of U.S. Provisional Patent Application Ser. No. 61/329,099, filed on Apr. 29, 2010, the entire disclosure of which is incorporated herein by reference.

FIELD

This disclosure generally relates to wireless communication networks, and more particularly, to a method and apparatus for a component carrier deactivation timer in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

According to one embodiment, a for a Component Carrier (CC) deactivation timer in a wireless communication system includes receiving a first Medium Access Control (MAC) Control Element (CE) for CC Management to activate a first Secondary CC (SCC) that has been already activated by using a second MAC CE for CC Management; and restarting a deactivation timer for the first SCC.

According to another embodiment, a method for a CC deactivation timer in a wireless communication system includes activating a first SCC by receiving a first MAC CE for CC Management carrying an activation signal for the first SCC, starting a deactivation timer for the first SCC when the first SCC is activated, receiving a second MAC CE for CC Management on a Primary CC (PCC) or a second SCC that is different from the first SCC to activate the first SCC which is already activated, and restarting the deactivation timer for the first SCC upon receiving the second MAC CE for CC Management.

According to another embodiment, a user equipment (UE) for a wireless communication system includes a control circuit for realizing functions of the UE, a processor installed in the control circuit, for executing a program code to command the control circuit, and a memory installed in the control circuit and coupled to the processor. The processor is configured to execute a program code stored in memory to receive a first Medium Access Control (MAC) Control Element (CE) for Component Carrier (CC) Management to activate a first Secondary CC (SCC) that has been already activated by using a second MAC CE for CC Management, and restart a deactivation timer for the first SCC.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced), 3GPP2 UMB (Ultra Mobile Broadband), WiMax, or some other modulation techniques.

In particular, The exemplary wireless communication systems devices described below may be designed to support one or more standards such as the standard offered by a consortium named "3rd Generation Partnership Project" referred to herein as 3GPP, including Document Nos. R2-101846 ("Stage 2 description of Carrier Aggregation"); 3GPP TS 36.331, V.9.1.0 ("Evolved Universal Terrestrial Radio Access (E-UTRA); Radio Resource Control (RRC) protocol specification (Release 9)"); and 3GPP TS 36.321, V.9.1.0 ("Evolved Universal Terrestrial Radio Access (E-UTRA); Medium Access Control (MAC) protocol specification (Release 9)"). The standards and documents listed above are hereby expressly incorporated herein.

Figure 1:
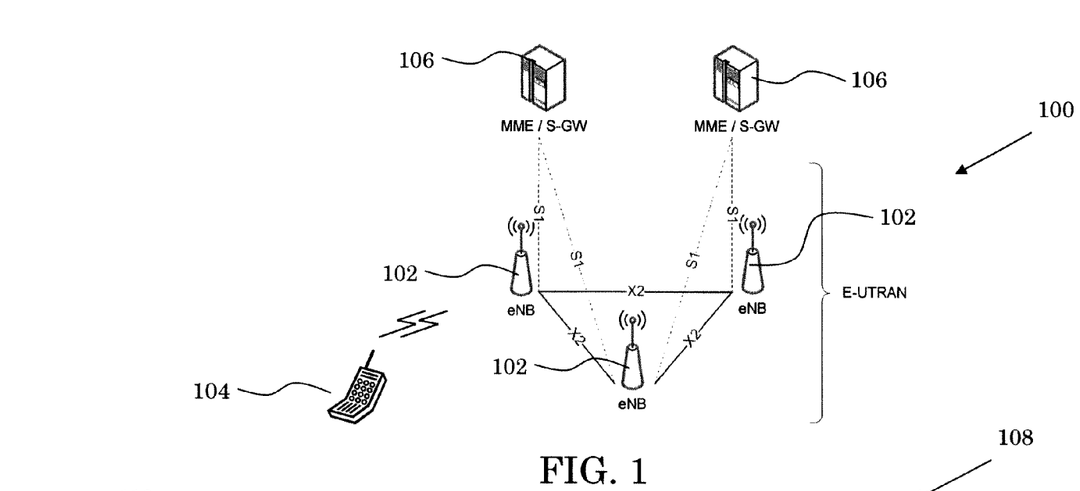
FIG. 1 shows a diagram of a wireless communication system according to one exemplary embodiment.

An exemplary network structure of an Evolved Universal Terrestrial Radio Access Network (E-UTRAN) 100 as a mobile communication system is shown in FIG. 1 according to one exemplary embodiment. The E-UTRAN system can also be referred to as a LTE (Long-Term Evolution) system or LTE-A (Long-Term Evolution Advanced). The E-UTRAN generally includes eNode B or eNB 102, which function similar to a base station in a mobile voice communication network. Each eNB is connected by X2 interfaces. The eNBs are connected to terminals or user equipment (UE) 104 through a radio interface, and are connected to Mobility Management Entities (MME) or Serving Gateway (S-GW) 106 through S1 interfaces.

Figure 2:
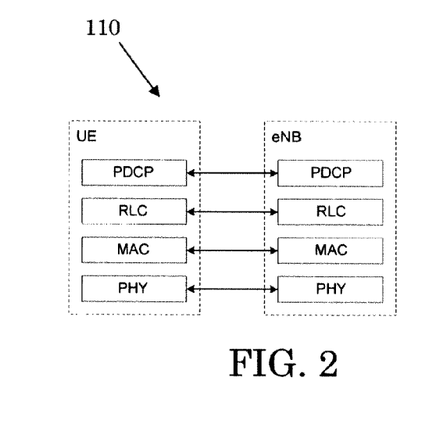
FIG. 2 shows a user plane protocol stack of the wireless communication system of FIG. 1 according to one exemplary embodiment.
Figure 3:
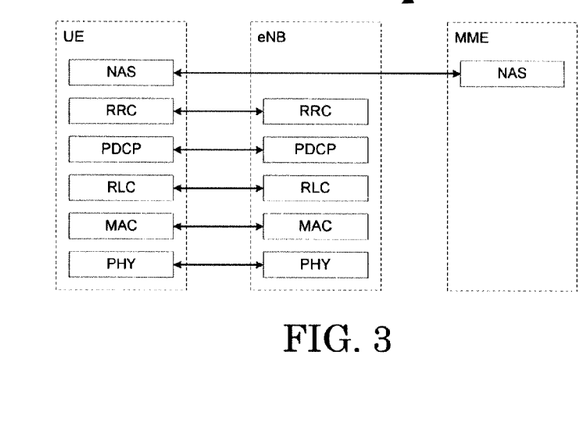
FIG. 3 shows a control plane protocol stack of the wireless communication system of FIG. 1 according to one exemplary embodiment.

Referring to FIGS. 2 and 3, the LTE system is divided into control plane 108 protocol stack (shown in FIG. 3) and user plane 110 protocol stack (shown in FIG. 2) according to one exemplary embodiment. The control plane performs a function of exchanging a control signal between a UE and an eNB and the user plane performs a function of transmitting user data between the UE and the eNB. Referring to FIGS. 2 and 3, both the control plane and the user plane include a Packet Data Convergence Protocol (PDCP) layer, a Radio Link Control (RLC) layer, a Medium Access Control (MAC) layer and a physical (PHY) layer. The control plane additionally includes a Radio Resource Control (RRC) layer. The control plane also includes a Network Access Stratum (NAS) layer, which performs among other things including Evolved Packet System (EPS) bearer management, authentication, and security control.

The PHY layer provides information transmission service using a radio transmission technology and corresponds to a first layer of an open system interconnection (OSI) layer. The PHY layer is connected to the MAC layer through a transport channel. Data exchange between the MAC layer and the PHY layer is performed through the transport channel. The transport channel is defined by a scheme through which specific data are processed in the PHY layer.

The MAC layer performs the function of sending data transmitted from a RLC layer through a logical channel to the PHY layer through a proper transport channel and further performs the function of sending data transmitted from the PHY layer through a transport channel to the RLC layer through a proper logical channel. Further, the MAC layer inserts additional information into data received through the logical channel, analyzes the inserted additional information from data received through the transport channel to perform a proper operation and controls a random access operation.

The MAC layer and the RLC layer are connected to each other through a logical channel. The RLC layer controls the setting and release of a logical channel and may operate in one of an acknowledged mode (AM) operation mode, an unacknowledged mode (UM) operation mode and a transparent mode (TM) operation mode. Generally, the RLC layer divides Service Data Unit (SDU) sent from an upper layer at a proper size and vice versa. Further, the RLC layer takes charge of an error correction function through an automatic retransmission request (ARQ).

The PDCP layer is disposed above the RLC layer and performs a header compression function of data transmitted in an IP packet form and a function of transmitting data without loss even when a Radio Network Controller (RNC) providing a service changes due to the movement of a UE.

The RRC layer is only defined in the control plane. The RRC layer controls logical channels, transport channels and physical channels in relation to establishment, re-configuration and release of Radio Bearers (RBs). Here, the RB signifies a service provided by the second layer of an OSI layer for data transmissions between the terminal and the E-UTRAN. If an RRC connection is established between the RRC layer of a UE and the RRC layer of the radio network, the UE is in the RRC connected mode. Otherwise, the UE is in an RRC idle mode.

Figure 4:
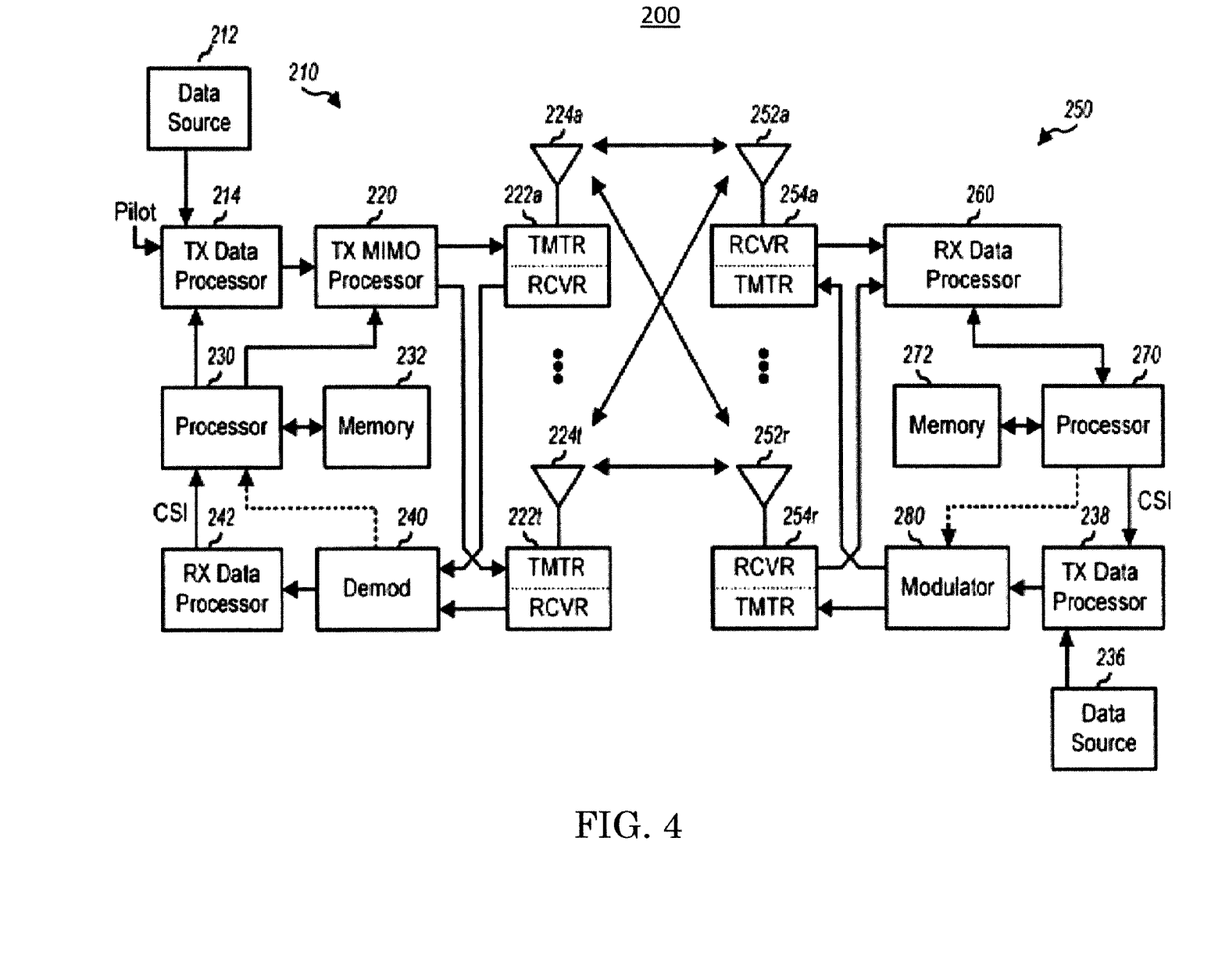
FIG. 4 is a block diagram of a transmitter system (also known as access network) and a receiver system (also known as UE) according to one exemplary embodiment.

FIG. 4 is a simplified block diagram of an exemplary embodiment of a transmitter system 210 (also known as the access network) and a receiver system 250 (also known as access terminal or UE in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 5:
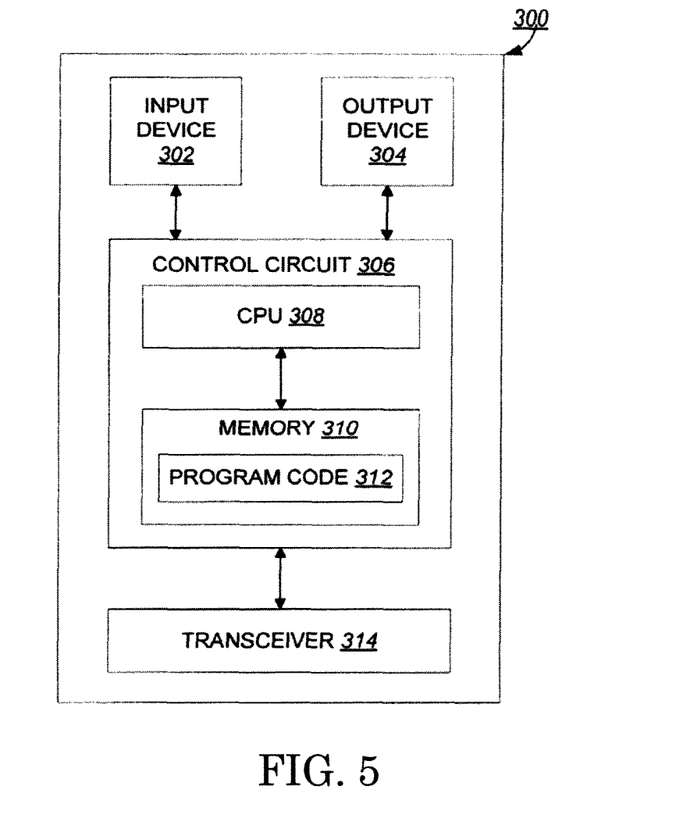
FIG. 5 is a functional block diagram of a UE according to one exemplary embodiment.

Turning to FIG. 5, this figure shows an alternative simplified functional block diagram of a communication device according to one exemplary embodiment. The communication device 300 in a wireless communication system can be utilized for realizing the UE 104 in FIG. 1, and the wireless communications system is preferably the LTE system, the LTE-A system or the like. The communication device 300 may include an input device 302, an output device 304, a control circuit 306, a central processing unit (CPU) 308, a memory 310, a program code 312, and a transceiver 314. The program code 312 includes the application layers and the layers of the control plane 108 and layers of user plane 110 as discussed above except the PHY layer. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

The LTE Downlink (DL) transmission scheme is based on Orthogonal Frequency Division Multiple Access (OFDMA), and the LTE Uplink (UL) transmission scheme is based on Single-Carrier (SC) Discrete Fourier Transform (DFT)-spread OFDMA (DFT-S-OFDMA) or equivalently, Single Carrier Frequency Division Multiple Access (SC-FDMA). LTE-Advanced (LTE-A), however, is designed to meet higher bandwidth requirements both in the DL and UL directions. In order to provide the higher bandwidth requirements, LTE-A utilizes component carrier aggregation. A user equipment (UE) with reception and/or transmission capabilities for carrier aggregation (CA) can simultaneously receive and/or transmit on multiple component carriers (CCs). A carrier may be defined by a bandwidth and a center frequency.

In LTE-A, operations in contiguous bandwidth aggregation or non-contiguous bandwidth aggregation are possible. The contiguous bandwidth aggregation uses contiguous carriers and the non-contiguous bandwidth aggregation uses dis-contiguous carriers. The number of aggregated carriers may be different in UL and DL. When the number of downlink carriers and that of uplink carriers are equal, it is called a symmetric aggregation, and when the numbers are different, it is called an asymmetric aggregation.

There are several physical control channels used in the physical layer that are relevant to CA operations. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACKNAK signals in response to uplink transmissions. A physical uplink control channel (PUCCH) carries uplink control information such as HARQ AC/NAK in response to downlink transmission, scheduling request and channel quality indicator (CQI). A physical uplink shared channel (PUSCH) carries uplink shared channel (UL-SCH).

Carriers may be divided into a primary component carrier (PCC) and a secondary component carrier (SCC). The PCC refers to a carrier that is constantly activated, and the SCC refers to a carrier that may be activated or deactivated according to particular conditions. Activation means that transmission or reception of traffic data may be performed or traffic data is ready for its transmission or reception on the concerned CC. Deactivation means that transmission or reception of traffic data is not permitted on the concerned CC. The UE uses only a single PCC or one or more SCCs along with the PCC.

A PCC is used by an eNB to exchange traffic and PHY/MAC control signaling with a UE. SCCs are additional carriers which the UE may use for traffic, only per eNB specific commands and rules received on the PCC. The PCC may be a fully configured carrier, by which major control information is exchanged between the eNB and the UE. The SCC may be a fully configured carrier or a partially configured carrier, which is allocated according to a request of the UE or according to an instruction of the eNB. The PCC may be used for entering of the UE into a network or for an allocation of the SCC. The PCC may be selected from among fully configured carriers, rather than being fixed to a particular carrier.

Activation and deactivation of DL CC's are performed by using MAC control signalling. Accordingly, a MAC Control Element (CE) for CC Management is provided, which includes at least an activation command or a deactivation command (i.e., explicit CC deactivation) for the secondary DL CC's configured for a UE. The CE is identified by a unique Logical Channel ID (LCID). For actual deactivation and activation signalling for the DL SCCs, the MAC CE for CC Management includes a 4/5 bit bitmap where each bit is representing one of the DL CCs that can be configured in the UE. A bit set to 1 denotes activation of the corresponding DL CC and a bit set to 0 denotes deactivation of the corresponding DL CC.

A timer for implicit CC deactivation is provided, the length of which is configured per UE by RRC. The deactivation timer is maintained per CC and is started when DL SCC is activated. DL SCC is deactivated when the deactivation timer expires or when a MAC CE for CC Management carries deactivation signalling. During data transmission, the CC specific deactivation timer is restarted based on the PDCCH on CCx (x denotes a specific CC) for downlink scheduling transmission or the PDCCH on CCx for uplink scheduling transmission.

As discussed above, the current triggers to re-start a deactivation timer are only by PDCCH scheduling on the SCC that corresponds to the deactivation timer. However, the eNB may prefer to keep several SCCs activated when not much traffic is ongoing or there is no traffic temporally. The reason why the eNB may prefer to keep several SCCs activated may be to either avoid PDCCH missing on SCC, which can results in unsynchronized or a mismatch situation between UE and eNB, or that the eNB can directly schedule data on SCC when data is coming at a later time. However, as explained in the following, by using the current triggers to re-start a deactivation timer, it is difficult and/or inconvenient to have the eNB keep several SCC's activated without much ongoing traffic. If eNB like to keep several SCC's activated, eNB have to send several PDCCH signaling on/for several SCCx to keep them alive (i.e. restart those deactivation timers to avoid expiry). One drawback is that if currently there is not much traffic ongoing or even no traffic at all, eNB still have to send some PDCCH signaling indicating some UL or DL resource for UE to send/receive some data. But these data may be probably padding (because there is not much data or even no data at all). Thus, some resource are wasted. Another drawback is the waste of too much PDCCH resources because if eNB like to keep n SCC activated then eNB would have to send n PDCCH signaling.

Figure 6:
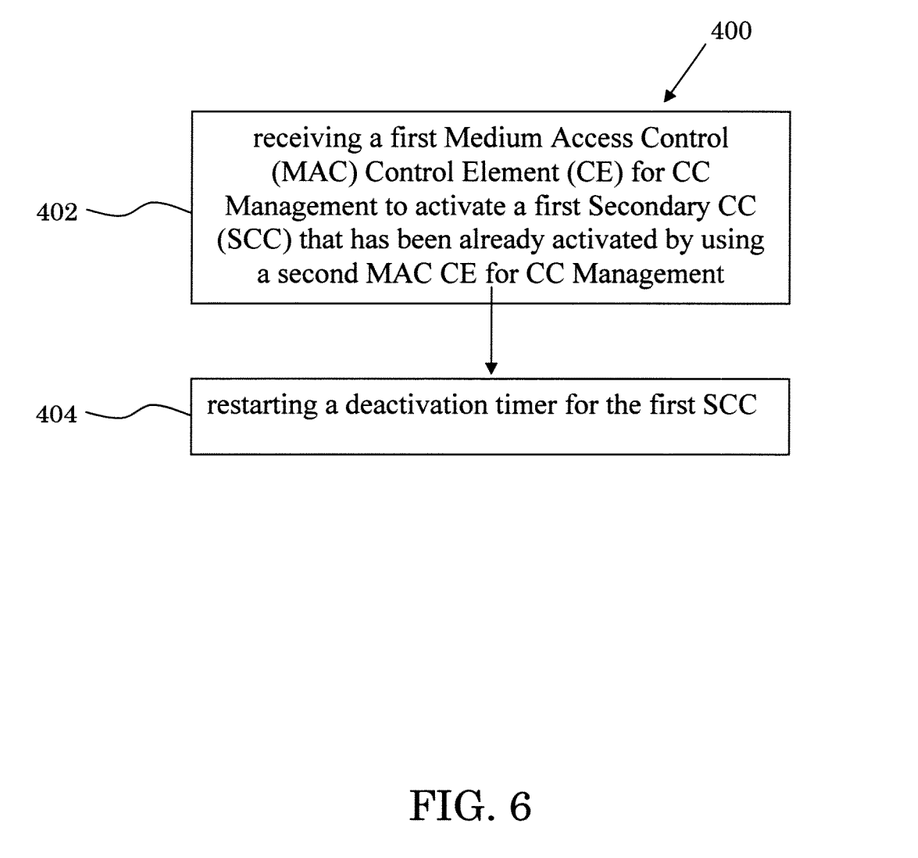
FIG. 6 shows a method for a component carrier deactivation timer in a wireless communication system according to an exemplary embodiment.

FIG. 6 illustrates an embodiment of a method for triggering a restart of a deactivation timer of a SCC that has been already activated. According to method 400, the deactivation timer of a SCC which has been already activated can be restarted with a MAC CE for CC Management rather than by PDCCH scheduling on the SCC. The method includes receiving a first MAC CE for CC Management at 402 to activate a first SCC that has been already activated by using a second MAC CE for CC Management. At step 404, a deactivation timer for the first SCC is restarted based upon receiving the first MAC CE for CC Management.

Figure 7:
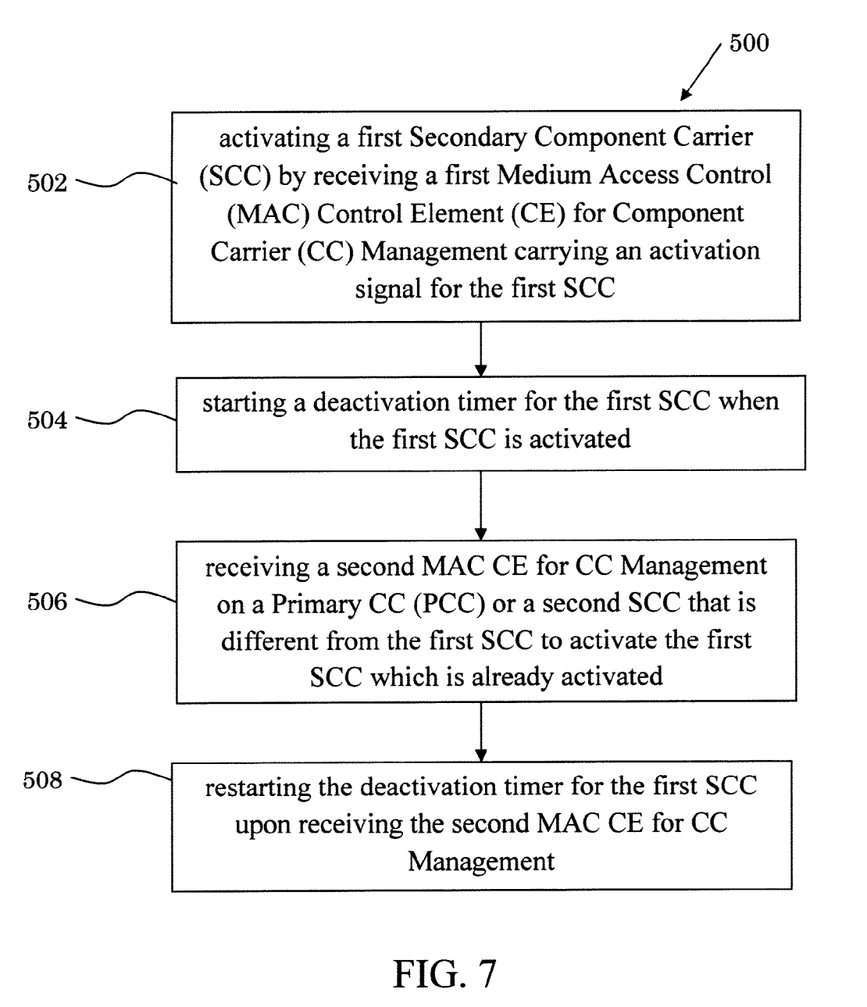
FIG. 7 shows a method for a component carrier deactivation timer in a wireless communication system according to another embodiment.

FIG. 7 shows an embodiment of a method 500 for using a MAC CE for CC Management to both activate a deactivated SCC and restart a deactivation timer of the activated SCC. A first SCC is activated at 502 by a signal carried on a MAC CE for CC Management. Upon activation of the first SCC, the deactivation timer for the first SCC is also activated at 504. The deactivation timer of the first SCC, which has been already activated, can be restarted at 508 when the UE receives at 506 a MAC CE for CC Management and the MAC CE is received on a PCC or a second SCC that is different from the first SCC to activate the first SCC which is already activated. Thus, according to the embodiments of FIGS. 6 and 7, the MAC CE for CC Management is not only used for the first activation of a deactivated SCC, but also used for restarting the deactivation timer of the activated SCC.

According to the above embodiment, the eNB does not have to depend only on sending a PDCCH scheduling on each SCC to re-start each corresponding SCC's deactivation timer. With the above embodiment, MAC control signaling is used to re-start a corresponding SCC's deactivation timer. Furthermore, the method according to the above embodiment does not introduce much complexity by reusing the MAC CE for CC management.

According to another embodiment with reference back to FIG. 5, which is a functional block diagram of a UE according to one exemplary embodiment, the UE 300 includes a program code 312 stored in memory 310. The CPU 308 executes the program code 312 to restart a deactivation timer of the first SCC when the UE receives a first MAC CE for CC Management to activate the first SCC that has been already activated by using a second MAC CE for CC Management.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a Component Carrier (CC) deactivation timer in a wireless communication system, comprising:
   receiving a first Medium Access Control (MAC) Control Element (CE) for CC Management to keep activating a first Secondary CC (SCC) that has been already activated by using a second MAC CE for CC Management; and
   restarting a deactivation timer for the first SCC upon receipt of the first MAC CE to keep activating the first SCC.

2. The method of claim 1, wherein the deactivation timer for the first SCC that has been already activated is restarted when the first MAC CE for CC Management is received on a second SCC that is different from the first SCC.

3. The method of claim 1, wherein the first SCC is originally activated with activation command signal carried by a MAC CE for CC Management.

4. The method of claim 1, wherein the deactivation timer is started when the first SCC is first activated.

5. The method of claim 1, wherein the first SCC is deactivated when the deactivation timer expires.

6. A method for a Component Carrier (CC) deactivation timer in a wireless communication system, comprising:
   activating a first Secondary Component Carrier (SCC) by receiving a first Medium Access Control (MAC) Control Element (CE) for CC Management carrying an activation signal for the first SCC;
   starting a deactivation timer for the first SCC when the first SCC is activated;
   receiving a second MAC CE for CC Management on a Primary CC (PCC) or a second SCC that is different from the first SCC to keep activating the first SCC which is already activated; and
   restarting the deactivation timer for the first SCC upon receipt of the second MAC CE to keep activating the first SCC.

7. The method of claim 6, wherein the first SCC is deactivated when the deactivation timer expires.

8. A user equipment (UE) for a wireless communication system, the UE comprising:
   a control circuit for realizing functions of the UE;
   a processor installed in the control circuit, for executing a program code to command the control circuit; and
   a memory installed in the control circuit and coupled to the processor;
   wherein the processor is configured to execute a program code stored in memory to receive a first Medium Access Control (MAC) Control Element (CE) for Component Carrier (CC) Management to keep activating a first Secondary CC (SCC) that has been already activated by using a second MAC CE for CC Management, and restart a deactivation timer for the first SCC upon receipt of the first MAC CE to keep activating the first SCC.

9. The UE of claim 8, wherein the deactivation timer for the first SCC that has been already activated is restarted when the first MAC CE for CC Management is received on a second SCC that is different from the first SCC.

10. The UE of claim 8, wherein the first SCC is originally activated with a MAC CE for CC Management.

11. The UE of claim 8, wherein the deactivation timer is started when the first SCC is first activated.

12. The UE of claim 8, wherein the first SCC is deactivated when the deactivation timer expires.

* * * * *